(12) United States Patent
Wieclaw et al.

(10) Patent No.: US 12,505,765 B2
(45) Date of Patent: Dec. 23, 2025

(54) PRINTABLE SIGNAGE FOR TRAFFIC AND PEDESTRIAN AREAS

(71) Applicant: PATCH RUBBER COMPANY, Weldon, NC (US)

(72) Inventors: Scott Wieclaw, Galena, OH (US); Marlo Carter, Roanoke Rapids, NC (US); Tim Donley, Rocky Mount, NC (US); Christopher J. Vidoli, Wake Forest, NC (US)

(73) Assignee: PATCH RUBBER COMPANY, Weldon, NC (US)

( * ) Notice: Subject to any disclaimer, the term of this patent is extended or adjusted under 35 U.S.C. 154(b) by 143 days.

(21) Appl. No.: 18/324,701

(22) Filed: May 26, 2023

(65) Prior Publication Data

US 2023/0386370 A1 Nov. 30, 2023

Related U.S. Application Data

(60) Provisional application No. 63/365,363, filed on May 26, 2022.

(51) Int. Cl.
*G09F 19/22* (2006.01)
*B32B 5/02* (2006.01)
(Continued)

(52) U.S. Cl.
CPC .............. *G09F 19/228* (2013.01); *B32B 5/02* (2013.01); *B32B 27/12* (2013.01); *B32B 37/24* (2013.01); *E01C 11/24* (2013.01); *E01C 23/18* (2013.01); *E01F 9/512* (2016.02); *E01F 9/524* (2016.02); *G09F 13/16* (2013.01); *B32B 2037/243* (2013.01); *B32B 2250/02* (2013.01); *B32B 2255/10* (2013.01); *B32B 2255/20* (2013.01); *B32B 2255/26* (2013.01); *B32B 2255/28* (2013.01); *B32B 2260/021* (2013.01);
(Continued)

(58) Field of Classification Search
CPC ........ G09F 19/228; G09F 13/16; E01F 9/512; E01F 9/524
See application file for complete search history.

(56) References Cited

U.S. PATENT DOCUMENTS 4,299,874 A * 11/1981 Jones ...................... E01F 9/512
428/323
5,310,278 A * 5/1994 Kaczmarczik .......... E01F 9/512
362/153.1
(Continued)

OTHER PUBLICATIONS

International Search Report and Written Opinion issued in PCT/US2023/023702 on Oct. 6, 2023, 12 pages.

*Primary Examiner* — Gary C Hoge
(74) *Attorney, Agent, or Firm* — Vorys, Sater, Seymour and Pease LLP; Rex W. Miller, II (57) ABSTRACT

A graphic assembly, such as a floor or road surface sign for vehicle traffic and/or pedestrian traveled areas, is provided. The graphic assembly can include a polymeric substrate layer fixed to a fabric layer that is positioned between the polymeric substrate layer and an adhesive layer. Further, the graphic assembly can comprise a top surface that includes a plurality of surface enhancement particles embedded within a particle receptive layer that is adjacent to the polymeric substrate layer. The plurality of surface enhancement particles include reflective particles and anti-skid particles.

20 Claims, 3 Drawing Sheets (51) Int. Cl.
- *B32B 27/12* (2006.01)
- *B32B 37/24* (2006.01)
- *E01C 11/24* (2006.01)
- *E01C 23/18* (2006.01)
- *E01F 9/512* (2016.01)
- *E01F 9/524* (2016.01)
- *G09F 13/16* (2006.01)

(52) U.S. Cl.
CPC ... *B32B 2260/025* (2013.01); *B32B 2260/046* (2013.01); *B32B 2264/101* (2013.01); *B32B 2274/00* (2013.01); *B32B 2305/073* (2013.01); *B32B 2305/18* (2013.01); *B32B 2305/77* (2013.01); *B32B 2307/412* (2013.01); *B32B 2307/416* (2013.01); *B32B 2307/744* (2013.01); *B32B 2315/08* (2013.01); *B32B 2519/00* (2013.01)

(56) References Cited

U.S. PATENT DOCUMENTS

| | | | | |
|---|---|---|---|---|
| 5,643,655 | A * | 7/1997 | Passarino | B32B 7/12 428/521 |
| 5,906,889 | A * | 5/1999 | Miron | E01F 9/512 428/323 |
| 5,981,033 | A * | 11/1999 | Haunschild | E01F 9/578 428/161 |
| 8,819,969 | B1 * | 9/2014 | Cissell | G09F 19/228 49/467 |
| 10,283,022 | B1 * | 5/2019 | Lowe | B32B 27/00 |
| 11,762,133 | B1 * | 9/2023 | Retterath | E01F 9/512 359/531 |
| 2003/0070579 | A1 * | 4/2003 | Hong | C09J 7/22 106/31.04 |
| 2003/0091815 | A1 * | 5/2003 | Buccellato | E01F 9/573 428/355 R |
| 2005/0181183 | A1 * | 8/2005 | Pacey | C09J 7/29 428/343 |
| 2006/0157577 | A1 * | 7/2006 | Brown | E01F 9/524 238/8 |
| 2008/0060242 | A1 * | 3/2008 | Greer | G09F 19/22 40/612 |
| 2008/0287221 | A1 * | 11/2008 | Babinsky | E01C 13/04 52/177 |
| 2010/0272962 | A1 * | 10/2010 | Davies | C09D 7/69 428/161 |
| 2011/0059295 | A1 * | 3/2011 | Greer | G02B 5/128 428/149 |
| 2012/0255129 | A1 * | 10/2012 | Jankura | C11D 17/046 427/290 |
| 2017/0131444 | A1 | 5/2017 | Xia et al. | |
| 2017/0326857 | A1 | 11/2017 | Weedlun et al. | |
| 2018/0371713 | A1 * | 12/2018 | Patnode | E01F 9/512 |
| 2019/0323185 | A1 * | 10/2019 | Filippov | E01F 9/524 |
| 2020/0024813 | A1 * | 1/2020 | Hedblom | G01S 17/88 |
| 2021/0395965 | A1 * | 12/2021 | Araki | E01F 9/512 |
| 2022/0170218 | A1 * | 6/2022 | Patnode | B32B 25/14 |
| 2023/0193086 | A1 | 6/2023 | Carter et al. | |
| 2024/0044090 | A1 * | 2/2024 | Jeganathan | E01C 23/14 |

* cited by examiner

PRINTABLE SIGNAGE FOR TRAFFIC AND PEDESTRIAN AREAS

This application claims priority to and the benefit of U.S. Provisional Application No. 63/365,363 filed May 26, 2022 and titled "Printable Signage for Traffic and Pedestrian Areas", which is hereby incorporated by reference herein in its entirety.

BACKGROUND

Printed signs that are adhered to a ground surface are commonly referred to as floor or ground graphics. Floor graphics are commonly used in areas of pedestrian foot traffic but when used in areas that include vehicles, such as cars and trucks, (e.g., parking lots, parking garages, cross walks, drive-thru lanes, transit stations, etc.) traditional floor graphics cannot withstand the forces exerted by the vehicles. The most common composition for floor graphic products is vinyl, which has the negative characteristic of low tensile strength; making it easy to stretch, flex, rip and tear. When used in areas of vehicular traffic (e.g., where vehicles accelerate, decelerate, and turn onto the material), forces such as static and kinetic friction between a tire and the signage material quickly cause failure of the floor graphic.

SUMMARY

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with accordance with another embodiment, a graphic assembly is provided. The graphic assembly can comprise a polymeric substrate layer fixed to a fabric layer that is positioned between the polymeric substrate layer and an adhesive layer. Further, the graphic assembly can comprise a top surface that includes a plurality of surface enhancement particles embedded within a particle receptive layer that is adjacent to the polymeric substrate layer. The plurality of surface enhancement particles include reflective particles and anti-skid particles.

In accordance with one or more embodiments, a ground graphic assembly is provided. The ground graphic assembly can comprise a polymeric substrate layer adjacent to a particle receptive layer. The graphic assembly can further comprise a plurality of reflective particles and anti-skid particles embedded into the particle receptive layer. Further, the graphic assembly can comprise a graphic layer selectively applied to a surface of the plurality of reflective particles and anti-skid particles such that one or more first reflective particles are covered by the graphic layer while one or more second reflective particles are exposed.

In accordance with a further embodiment, a method for manufacturing a floor sign is provided. The method can comprise providing a polymeric substrate layer. The method can also comprise impressing a fabric layer to a first surface of the polymeric substrate layer. Further, the method can comprise applying a particle receptive layer to a second surface of the polymeric substrate layer. The first surface is opposite the second surface. Also, the method can comprise at least partially embedding a plurality of surface enhancement particles into the particle receptive layer.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present exemplary embodiments are described in relation to a graphic products (graphic assemblies) used for markings and signs on surfaces that experience pedestrian and/or vehicular traffic. The present exemplary embodiments described herein last longer than other products and options currently on the market. However, it is to be appreciated that the present exemplary embodiments are also amenable to other like applications.

Traditionally, floor graphics lack durability due to at least poor strength of the graphic material and can be quickly destroyed through regular use. Further, existing floor graphics do not include retroreflectivity, which is desirable for low light and nighttime conditions, where reflectivity can improve visibility of the floor graphics so as to be understandable from a safe distance (e.g., thereby enabling viewership in time to permit a proper driving response). Further, traditional floor graphics can be slippery which can result in slips, trips, and falls.

Current printable floor and ground graphics used as signage/marking in highway/parking areas are thin, have poor durability, have little to no retroreflectivity, and often lack high levels of slip resistance for outdoor environments. The most common composition for current floor graphic products is vinyl, which has low tensile strength and is easy to stretch, flex, rip and/or tear. When used in areas of vehicular traffic (e.g., where vehicles accelerate, decelerate, and/or turn onto the material), static and/or kinetic friction between the tires of the vehicles and the floor graphic can degrade the graphic. Further, typical floor graphic materials lack slip resistance, making them dangerous if used in areas of pedestrian foot traffic. The present disclosure provides certain improvements to printable ground graphics, including increased durability, retroreflectivity, and slip resistance.

Figure 1:
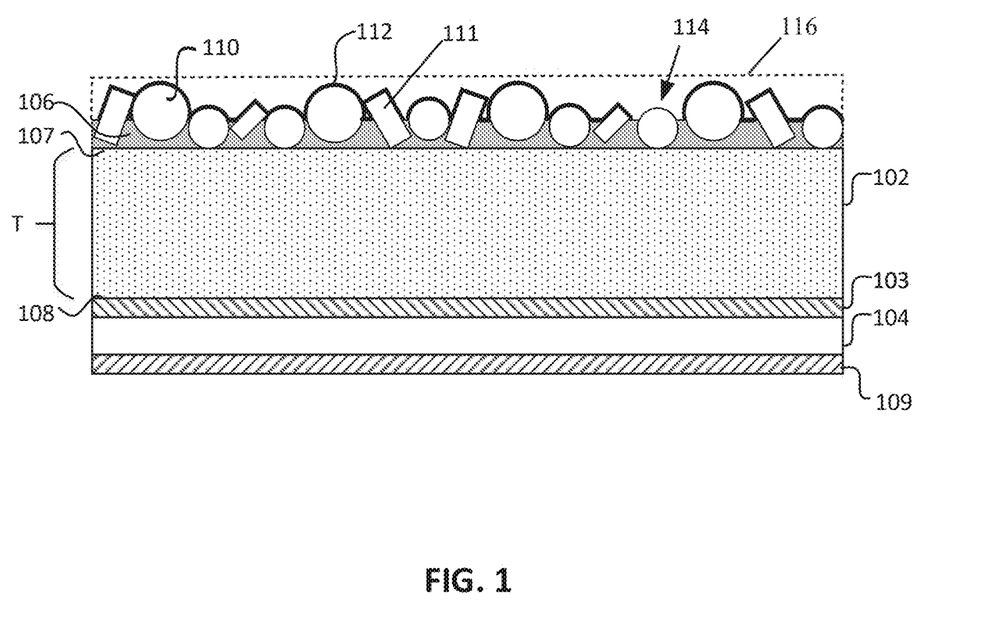
FIG. 1 illustrates a diagram of a cross-sectional view of a non-limiting example graphic assembly in accordance with one or more embodiments described herein.

FIG. 1 depicts a cross-sectional view of a non-limiting example graphic assembly 100 in accordance with one or more embodiments described herein. The graphic assembly 100 includes a polymeric substrate layer 102 that can be reinforced with a fabric layer 103, a bottom adhesive layer 104, and/or a particle receptive layer 106. As shown in FIG. 1, the polymeric substrate layer 102 has a first surface 107 (e.g., a top surface) and a second surface 108 (e.g., a bottom surface). For example, the first surface 107 and the second surface 108 can be opposite each other. Further, the first surface 107 and/or the second surface 108 can be substantially planar.

In one or more embodiments, the fabric layer 103 can be adjacent to the second surface 108 of the polymeric substrate layer 102 and positioned between the polymeric substrate layer 102 the adhesive layer 104. For example, the fabric layer 103 can abut the polymeric substrate layer 102. In various embodiments, the fabric layer 103 is fixed to the polymeric substrate layer 102. The adhesive layer 104 facilitates adhesion of the graphic assembly 100 to a road surface/parking surface (e.g., the adhesive layer 104 is configured to adhere the graphic assembly 100 to a target surface, such as a floor, road, and/or the like). The particle receptive layer 106 is adjacent to the first surface 107 of the polymeric substrate layer 102 and provides the base color properties of the graphic assembly 100 as well as an embedment location for the surface enhancement particles described herein.

The polymeric substrate layer 102 is generally a durable material having sufficient impact resistance and/or tear resistance. The polymeric substrate layer 102 can be made of, but is not limited to, a mixture of polymer, filler, and/or plasticizer. In some embodiments, the polymeric substrate layer 102 is an elastomeric material. The elastomeric material can include crosslinking or can be without crosslinking. The polymer material of the polymer layer can include synthetic or natural polymers. For instance, the polymeric substrate layer 102 can be comprise a poly(propene) polymer and/or the like (e.g., 1-propene, 2-methyl-, homopolymer).

The polymeric substrate layer 102 has a thickness T that can range from, for example, about 0.005 inch to about 0.3 inch. In some further embodiments, the thickness T ranges from, for example, about 0.010 inch to about inch. It is to be appreciated that the thickness T of the polymeric substrate layer 102 is not limiting. The thickness T is such that the polymeric substrate layer 102, along with the embedded fabric layer 103, provides dimensional stability to the graphic assembly 100; making the graphic assembly 100 resistant to damage due to vehicular traffic (e.g., where vehicles accelerate, decelerate, and/or turn) on top of the graphic assembly 100, where the damage can be the result of forces such as static and kinetic friction between a tire and the graphic assembly 100. Further, the dimensional stability of the polymeric substrate layer 102 and the fabric layer 103 allow the graphic assembly 100 to remain flat for printing, and aid in installation and removal. Additionally, the graphic assembly 100 exhibits strength by reducing damage or failure from rips/tears/stretching because of the combination of materials.

The polymeric substrate layer 102 can be manufactured by calendaring molten polymers for the production of a continuous sheet or film (e.g., squeezing the melt between a sets of heated rollers). During or after the manufacturing process, the fabric layer 103 can be impressed into the second surface 108 of the polymeric matrix of the polymeric substrate layer 102. The fabric layer 103 can be a woven or non-woven fabric including, but not limited to: polyester, nylon, cotton, other known textile materials, a combination thereof, and/or the like. In some embodiments, the fabric layer 103 is a fabric scrim or gauze.

As illustrated in FIG. 1, the adhesive layer 104 is applied to the bottom of the fabric layer 103, opposite the polymeric substrate layer 102. This location serves to adhere to the graphic assembly 100 to a target surface. In preferred embodiments, the adhesive layer 104 is a pressure sensitive adhesive (e.g., a generally non-reactive adhesive which forms an adhesive bond when pressure is applied to the graphic assembly 100). In other embodiments, the adhesive layer 104 can be a water/solvent activated adhesive. In yet still other embodiments, the adhesive layer 104 can be a heat activated adhesive. It is to be appreciated that in the process of manufacturing the graphic assembly 100, the adhesive layer 104 is not required to be applied to the fabric layer 103 directly and then the graphic assembly 100 applied to the target surface; rather, the adhesive layer 104 can be provided to the target surface and the remaining portions of the graphic assembly 100 are stacked on top of the adhesive layer 104 applied to the target surface.

The thickness of the adhesive layer 104 can range from, for example, about 0.002 inches (2 mil) to about 0.050 inches (50 mil). However, the thickness of the pressure sensitive adhesive of the adhesive layer 104 is not limiting. In some embodiments, the adhesive layer 104 is covered with a release liner 109, generally composed of a plastic material. The release liner 109 can prevent the adhesive layer 104 from contact and premature bonding to a target surface. When a graphic assembly 100 is in position and ready for attachment to a target surface, the release liner 109 can be removed to expose the underlying adhesive layer 104.

Also illustrated in FIG. 1, the graphic assembly 100 can include a particle receptive layer 106. In some embodiments, the particle receptive layer 106 can be a coating layer applied to the polymeric substrate layer 102. The particle receptive layer 106 can be configured to receive and hold particles applied to, and/or embedded within, the particle receptive layer 106. The particle receptive layer 106 adds further durability to the graphic assembly 100 and can provide ultra violet ("UV") protection to the underlying layers (polymeric substrate layer 102, adhesive layer 104, and/or fabric layer 103). In some embodiments, the particle receptive layer 106 can be a paint-like material including, but not limited to: a polyurethane, acrylic, similar material, a combination thereof, and/or the like. However, it is to be appreciated that the paint chemistry is not limiting. In some embodiments, the particle receptive layer 106 can be a curable material such as an epoxy material.

The particle receptive layer 106 can be applied to the first surface 107 of the polymeric substrate layer 102 by a variety of known methods including, but not limited to: web roller coating, spraying, dipping, a combination thereof, and/or the like. The thickness of particle receptive layer 106 can range from, for example, about 0.001 inch to about 0.01 inch; although the thickness of the particle receptive layer 106 is not limiting.

As illustrated in FIG. 1, the particle receptive layer 106 can be embedded with reflective particles 110 and/or anti-skid particles 111, collectively referred to herein as "surface enhancement particles." In some embodiments, the reflective particles 110 and/or anti-skid particles 111 are applied to the particle receptive layer 106 prior to curing or solidification of the particle receptive layer 106. The surface enhancement particles provide some attribute to the surface of the graphic assembly 100, such as added reflectivity and anti-skid properties.

The reflective particles 110 provide for retroreflectivity for low light visibility. In some embodiments, the reflectively may be greater than 500 as measured using a retroreflectometer. In some embodiments, the reflective particles 110 are glass beads that range in size from, for example, about 0.0001 mm to about mm in diameter. While the reflective particles 110 are illustrated as circular particles, the shape of the reflective particles 110 are not limiting and other shapes of beads may be used without departing from the scope of this disclosure. For example, the reflective particles 110 can have a polygonal shape. Further, the reflective particles 110 can have a uniform size, or can be composed of a variety of sizes.

The anti-skid particles 111 provide an increased coefficient of friction to the graphic assembly 100. The skid resistance is measured using a British pendulum tester, which is a dynamic pendulum impact-type tester used to measure the energy loss when a rubber slider edge is propelled over a test surface. Values are typically greater than 45. The anti-skid particles 111 can include particles having an irregular shape (e.g., three-dimensional polygonal shapes, which can be non-uniform with respect to each other). The anti-skid particles 111 may be composed of, but not limited to: glass, ceramics, aluminum-oxide, a combination thereof, and/or the like. However, it is to be appreciated that this list of materials is not limiting and that anti-skid particles 111 of other materials may be substituted herein without departing from the scope of this disclosure. Further, the anti-skid particles 111 can have a uniform size, or can be composed of a variety of sizes.

The surface enhancement particles (e.g., beads of reflective particles 110 and/or anti-skid particles 111) can be embedded into the particle receptive layer 106 before the particle receptive layer 106 is cured. Once the particle receptive layer 106 is cured, the surface enhancement particles can be held in place by the particle receptive layer 106. As shown in FIG. 1, at least a portion of the surface enhancement particles can extend beyond the outer surface of the particle receptive layer 106, so as to be exposed to an ambient environment at least partially surrounding the graphic assembly 100. For example, at least a portion of the surface enhancement particles can extend from the particle receptive layer 106.

The graphic assembly 100 also include a graphic layer 112 (e.g., an ink layer) applied to the particle receptive layer 106 and the surface enhancement particles (e.g., applied to the reflective particles 110 and the anti-skid particles 111). For example, the particle receptive layer 106 and the surface enhancement particles can constitute a top surface, where the graphic layer 112 can be selectively applied to the top surface so as to cover one or more portions of the surface enhancement particles. In this way, the graphic layer 112 (e.g., a printed ink layer) is can be the topmost layer of the graphic assembly 100. The graphic layer 112 can be colored or patterned as desired. For example, the graphic layer 112 can depict a desired image and/or text.

In some embodiments, the graphic layer 112 may be applied by means of a digital print (e.g., a UV print, an eco-solvent print, a solvent print, latex print, and/or the like). In other embodiments, the graphic layer 112 can be applied by screen printing. In some embodiments, the graphic layer 112 is a urethane-based paint. In other embodiments, the graphic layer 112, is a polyurethane-based paint. However, it is to be appreciated the paint chemistry is not limiting. Additionally, the graphic layer 112 can be absent from one or more areas of the particle receptive layer 106 and/or surface enhancement particles to render exposed surface areas 114. Due to the absence of graphic layer 112 in the exposed surface areas 114, the one or more surface enhancement particles (e.g., reflective particles 110 and/or anti-skid particles 111) can render their associated properties uninhibited. For example, the reflective particles 110 within the exposed surface areas 114 can provide the graphic assembly 100 with high retroreflectivity. For instance, portions of the surface enhancement materials extending from the particle receptive layer 106 and located in the exposed surface areas 114 can remain uncovered by the graphic layer 112 and/or the particle receptive layer 106.

As a top layer of the graphic assembly 100, the graphic layer 112 exhibits sufficient adhesion to the particle receptive layer 106. In some further embodiments, the graphic layer 112 is also resistant to typical cleaning chemicals allowing for the graphic assembly 100 to be cleaned without damaging the structure or color properties of the graphic assembly 100. In some embodiments, the graphic layer 112 aids in maintaining the position of the reflective particles 110 and/or anti-skid particles 111 embedded in the particle receptive layer 106.

In some embodiments, the graphic assembly 100 includes a clear coat layer 116 covering the entirety, or near entirety, of the graphic layer 112 (e.g., a printed ink layer) and any exposed surface area 114. For example, the coat layer 116 can be composed of a transparent protectant layer. For instance, the clear coat layer 116 (e.g., a protectant layer) can comprise an acrylic polymer resin and/or silicone resin. The clear coat layer 116 can provide additional wear resistance properties. The clear coat layer 116 can also provide UV protection that prevents or inhibits UV light from degrading and/or fading the underlying graphic layer 112.

In one or more embodiments, the graphic assembly 100 can lack the graphic layer 112. For example, the graphic assembly 100 can comprise a transparent protectant layer applied directly to the surface enhancement particles and/or particle receptive layer 106. For instance, the entirety, or near entirety, of a top surface of the particle receptive layer 106 and/or surface enhancement particles can be an exposed surface area 114, which can be remain exposed to the ambient environment or can be covered by a transparent protectant layer.

In some embodiments, the graphic assembly 100 described herein are preferably configured as a roll of material of a certain width often wound around a core, allowing for a length to be pulled from the roll and printed.

Figure 2:
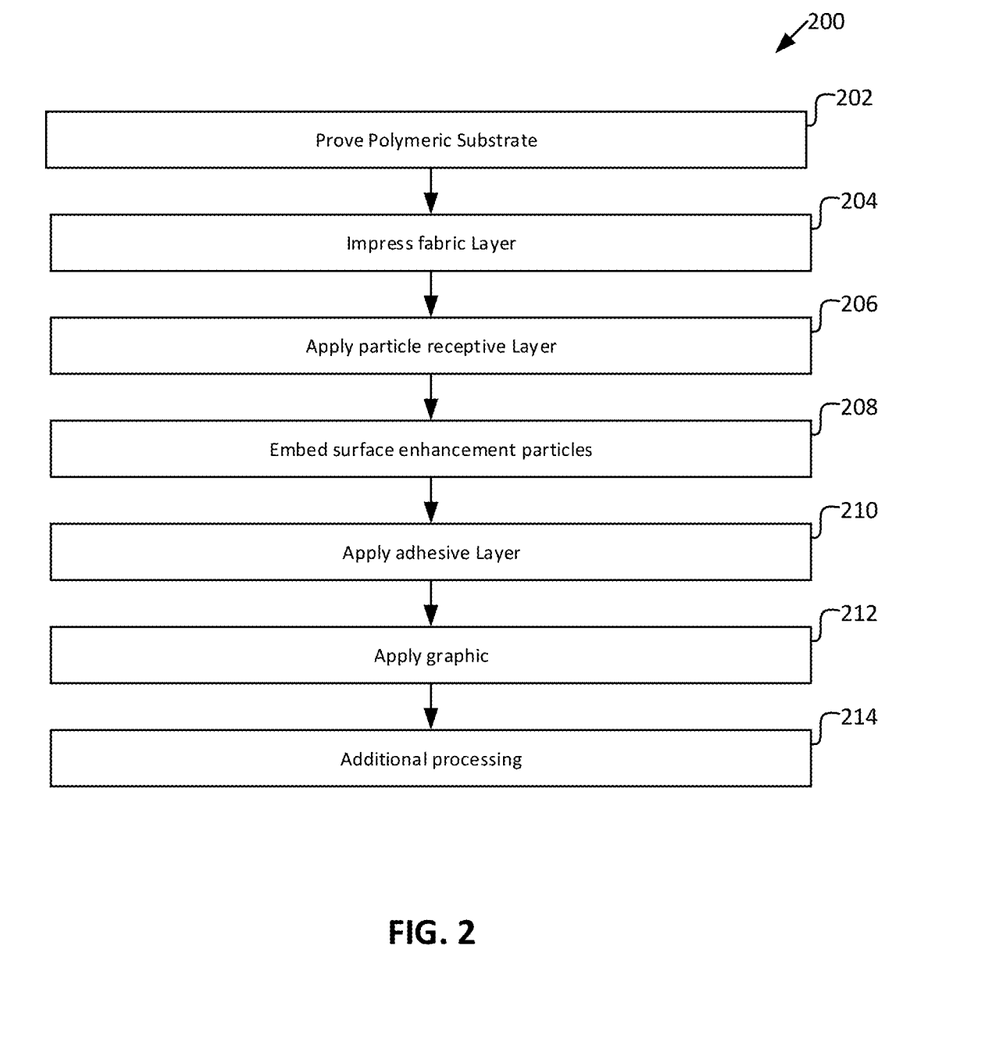
FIG. 2 illustrates a flow diagram of a non-limiting example method for manufacturing a graphic assembly in accordance with one or more embodiments described herein.

FIG. 2 illustrates a flow diagram of a non-limiting example manufacturing method 200 for manufacturing a graphic assembly 100 in accordance with one or more embodiments described herein. At 202, the method 200 can comprise providing a polymeric substrate layer 102. At 202, a polymeric substrate such as polymeric substrate layer 102 is manufactured. The polymeric substrate layer 102 can be provided in various ways and can be commercially available as sheets of polymeric material or a roll of polymeric material. Generally, the polymeric material of the polymeric substrate layer 102 can be extruded or calendared from a mixture of polymer, filler, and/or plasticizer. The thickness T of the polymeric substrate layer 102 is such that the polymeric material provides dimensional stability to the resulting graphic assembly 100, making it resistant to damage due to vehicular traffic.

At 204 the method 200 can comprise, impressing a fabric layer 103 onto a bottom side (e.g., the second surface 108) of the polymeric substrate layer 102. For example, while the polymeric substrate layer 102 is still soft from the calendar or extruding process, the fabric layer 103 can be impressed with pressure and/or heat to the bottom surface thereof (e.g., essentially melding the two layers together). The dimensional stability property of the polymeric substrate layer 102 reinforced with the fabric layer 103 allows the graphic assembly 100 to remain flat for printing, and aid in installation and removal.

At 206, the method can comprise applying a particle receptive layer 106 to a top side (e.g., the first surface 107) of the polymeric substrate layer 102. The Application can be performed via known methods of applying paint-like substances to substrates. Such application methods include, but are not limited to, spraying and rolling.

At 208, the method 200 can comprise embedding one or more surface enhancement particles (e.g., reflective particles 110 and/or anti-skid particles 111) into the particle receptive layer 106. In one or more embodiments, the particle receptive layer 106 can be cured after the embedding at 208. In some embodiments, heat and pressure can be used to embed the surface enhancement particles into the particle receptive layer 106. In other embodiments, surface enhancement particles can be added to the particle receptive layer 106 while the particle receptive layer 106 is curing. Once the particle receptive layer 106 with surface enhancement particles is cured the surface enhancement particles are thereby bonded to the first surface 107 of the polymeric substrate layer 102. In some such embodiments, the reflective particles 110 and/or anti-skid particles 111 partially penetrate the particle receptive layer 106 (e.g., as shown in FIG. 1). In some embodiments, the surface enhancement particles are adhesively applied to the particle receptive layer 106 or directly applied (e.g., via adhesive) to the first surface 107 of the polymeric substrate layer 102.

At 210, the method 200 can comprise applying an adhesive layer 104 to a bottom surface of fabric layer 103, such that the fabric layer 103 is positioned between the polymeric substrate layer 102 and the adhesive layer 104. The adhesive layer 104 may be directly applied to the fabric layer 103 by a variety of methods including spraying, printing, extruding, calendaring, laminating, a combination thereof, and/or the like. In some embodiments, pressure sensitive adhesive in a sheet form is laminated to the polymeric substrate layer 102 and/or the fabric layer 103 (e.g., by a roller or roll-to-roll machine) to form the adhesive layer 104. In some embodiments, the adhesive material (e.g., adhesive sheet) is sandwiched between two release liners, where one liner is removed to expose a surface of the adhesive material that is coupled to the polymeric substrate layer 102 and/or fabric layer 103 to form the adhesive layer 104, while a second surface of the adhesive layer is still in contact with a second release liner (e.g., release liner 109). In other embodiments, a release liner 109 may be applied to the adhesive layer as a protectant (e.g., as shown in FIG. 1).

In some embodiments, at 210, the adhesive layer 104 is applied to a target surface rather than first to the bottom of the fabric layer 103. That is, adhesive material can be sprayed, laminated or otherwise adhered to a target surface to form the adhesive layer 104. Subsequently, the remaining components of the graphic assembly 100 (polymeric substrate layer 102 and/or bonded fabric layer 103 along with the particle receptive layer 106, surface enhancement particles and graphic layer 112) can be placed in adhesive contact with the adhesive layer 104 on the target surface (e.g., road).

At 212, the method 200 can comprise applying a graphic (e.g., via graphic layer 112) to the graphic assembly 100. At 212, a graphic (e.g., in the form of a graphic layer 112) can be applied to the particle receptive layer 106 and/or the surface enhancement particles. The application of the graphic (e.g., graphic layer 112, such as a printed ink layer) can provide for some areas of the particle receptive layer 106 and/or surface enhancement particles to be covered with graphic material (e.g., ink), while remaining absent from other areas (e.g., exposed surface areas 114) so as to leave one or more of the surface enhancement particles visible (e.g., so as to leave one or more of the reflective particles 110 exposed). The application of the graphic at 212 can be accomplished by, for example, digital printing methods and/or by screen printing inks/paint.

In one or more embodiments, the method 200 can also include additional processing at 214 (e.g., comprising the application of a clear coat to provide further protection to the graphic). In some embodiments, the additional processing at 214 includes providing a top protective coating over the graphic/painted layer in accordance with one or more embodiments described herein. That is, the graphic assembly 100 can be additionally processed based on an intended application of the graphic assembly 100. For example and without limitation, if the graphic assembly 100 is intended to be in a sun lit area, the additional processing at 214 can include application of a UV protectant to minimize degradation and fading of the paint. As another illustrative example, if the graphic assembly 100 is intended to be in an area with aggressive solvents, the additional processing at 214 can include application of a hard coat or solvent protective layer to protect the underlying assembly from solvent spills and the like.

Figure 3:
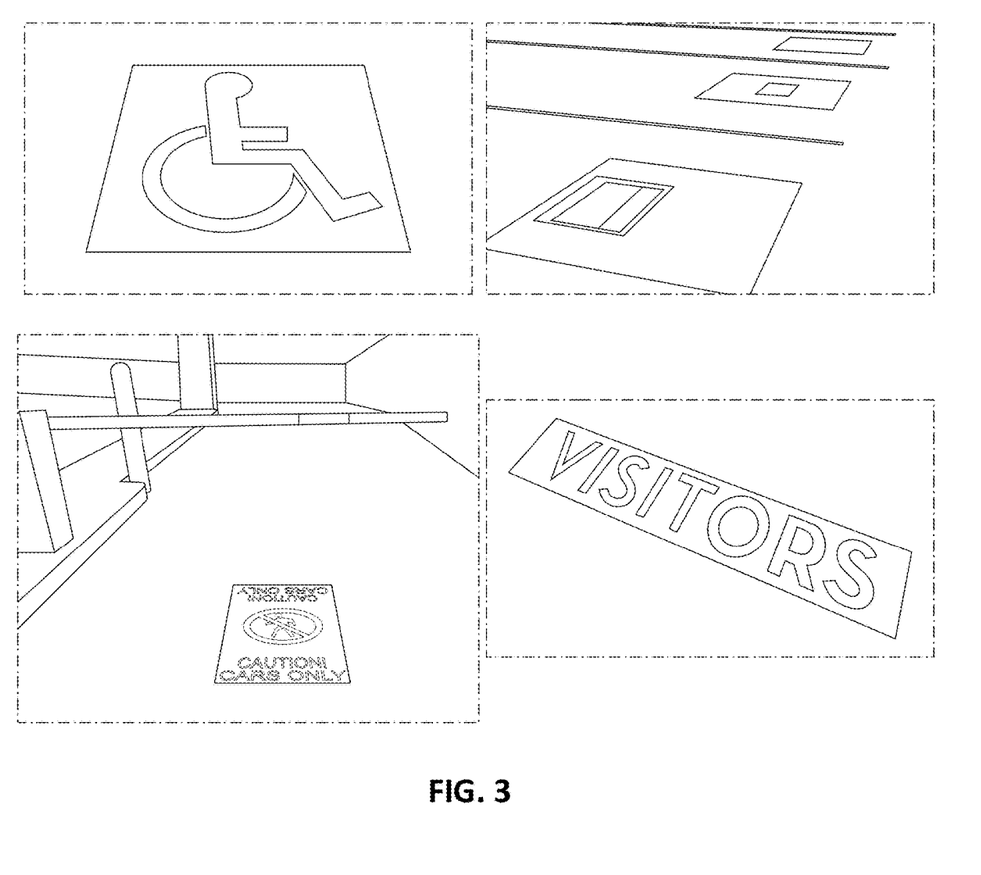
FIG. 3 illustrates various example graphic assemblies in accordance with one or more embodiments described herein.

It is to be appreciated that while the features of method 200 are presented in the order above, the order of method 200 is not limiting and that certain features may occur before others. For example and without limitation, the application of the adhesive layer at 210 may occur after application of the graphic at 212 or FIG. 3 includes example graphic assemblies 100 created in accordance with one or more embodiments described herein. These examples are provided to illustrate the articles, devices and processes of the present disclosure. The examples are merely illustrative and are not necessarily intended to limit the disclosure to the materials, conditions, or process parameters set forth therein. For example, illustrated in FIG. 3 are graphic assemblies 100 for road ways, parking areas, walkways, and parking garages.

Therefore, the disclosed products and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure.

The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

Additional Embodiments

The present disclosure is also directed to the following exemplary embodiments, which can be practiced in any combination thereof:

Embodiment 1: A graphic assembly comprising: a polymeric substrate layer fixed to a fabric layer that is positioned between the polymeric substrate layer and an adhesive layer; and a top surface that includes a plurality of surface enhancement particles embedded within a particle receptive layer that is adjacent to the polymeric substrate layer, wherein the plurality of surface enhancement particles include reflective particles and anti-skid particles.

Embodiment 2: The graphic assembly of embodiment 1, wherein the polymeric substrate layer is positioned between the particle receptive layer and the fabric layer, wherein the adhesive layer is adjacent to the fabric layer, and wherein the fabric layer is positioned between the polymeric substrate layer and the adhesive layer.

Embodiment 3: The graphic assembly of any of embodiments 1-2, further comprising a transparent protectant layer covering the particle receptive layer and the plurality of surface enhancement particles.

Embodiment 4: The graphic assembly of any of embodiments 1-3, wherein the fabric layer is fixed to the polymeric substrate layer.

Embodiment 5: The graphic assembly of any of embodiments 1-4, wherein at least a portion of the plurality of surface enhancement particles extends beyond a surface of the particle receptive layer.

Embodiment 6: The graphic assembly of any of embodiments 1-5, wherein the one or more second reflective particles are arranged in the particle receptive layer so as to provide the graphic assembly with a retroreflective property.

Embodiment 7: The graphic assembly of any of embodiments 1-6, wherein the adhesive layer is composed of a pressure sensitive adhesive.

Embodiment 8: The graphic assembly of any of embodiments 1-7, a graphic layer selectively applied to a portion of the top surface, wherein the graphic layer is a urethane based paint.

Embodiment 9: The graphic assembly of any of embodiments 1-8, wherein the reflective particles are glass beads.

Embodiment 10: A ground graphic assembly, comprising: a polymeric substrate layer adjacent to a particle receptive layer; a plurality of reflective particles and anti-skid particles embedded into the particle receptive layer; and a graphic layer selectively applied to a surface of the plurality of reflective particles and anti-skid particles such that one or more first reflective particles are covered by the graphic layer while one or more second reflective particles are exposed.

Embodiment 11: The ground graphic assembly of embodiment 10, wherein a portion of the plurality of reflective particles and anti-skid particles extend from the particle receptive layer and is positioned outside the particle receptive layer.

Embodiment 12: The ground graphic assembly of any of embodiments 10-11, a fabric layer fixed to the polymeric substrate layer, wherein the fabric layer is positioned on an opposite side of the polymeric substrate layer as the particle receptive layer.

Embodiment 13: The ground graphic assembly of any of embodiments 10-12, wherein the polymeric substrate layer is an elastomeric material.

Embodiment 14: The ground graphic assembly of any of embodiments 10-13, wherein the anti-skid particles are irregularly shaped.

Embodiment 15: A method for manufacturing a floor sign, the method comprising: providing a polymeric substrate layer; impressing a fabric layer to a first surface of the polymeric substrate layer; applying a particle receptive layer to a second surface of the polymeric substrate layer, wherein the first surface is opposite the second surface; and at least partially embedding a plurality of surface enhancement particles into the particle receptive layer, wherein the plurality of surface enhancement particles include reflective particles.

Embodiment 16: The method of embodiment 15, further comprising: applying an adhesive layer to the fabric layer, wherein the adhesive layer is configured to adhere the floor sign to a target surface.

Embodiment 17: The method of any of embodiments 15-16, wherein the plurality of surface enhancement particles further include anti-skid particles.

Embodiment 18: The method of any of embodiments 15-17, wherein the reflective particles are glass beads.

Embodiment 19: The method of any of embodiments 15-18, further comprising: curing the particle receptive layer to secure the position of the plurality of surface enhancement particles.

Embodiment 20: The method of any of embodiments 15-19, further comprising: selectively applying a graphic layer to cover a portion of the plurality of surface enhancement particles.

What is claimed is:

1. A graphic assembly comprising:
a polymeric substrate layer fixed to a fabric layer that is positioned between the polymeric substrate layer and an adhesive layer; and
a top surface that includes a plurality of surface enhancement particles embedded within a particle receptive layer that is adjacent to the polymeric substrate layer, wherein the plurality of surface enhancement particles include reflective particles and anti-skid particles;
wherein the polymeric substrate layer is positioned between the particle receptive layer and the fabric layer, wherein the adhesive layer is adjacent to the fabric layer; and
wherein the fabric layer is impressed onto a surface of the polymeric substrate layer to thereby attach the fabric layer to the polymeric substrate layer.

2. The graphic assembly of claim 1, further comprising a transparent protectant layer covering the particle receptive layer and the plurality of surface enhancement particles.

3. The graphic assembly of claim 1, wherein at least a portion of the plurality of surface enhancement particles extends beyond a surface of the particle receptive layer.

4. The graphic assembly of claim 1, wherein one or more of the reflective particles are arranged in the particle receptive layer so as to provide the graphic assembly with a retroreflective property.

5. The graphic assembly of claim 1, wherein the adhesive layer is composed of a pressure sensitive adhesive.

6. The graphic assembly of claim 1, further comprising:
a graphic layer selectively applied to a portion of the top surface, wherein the graphic layer is a urethane based paint.

7. The graphic assembly of claim 1, wherein the reflective particles are glass beads.

8. The graphic assembly of claim 1, further comprising a release liner engaged with the adhesive layer to prevent the adhesive layer from premature contact with a target surface.

9. A ground graphic assembly, comprising:
a polymeric substrate layer adjacent to a particle receptive layer;
a plurality of reflective particles and anti-skid particles embedded into the particle receptive layer;
a graphic layer selectively applied to a surface of the plurality of reflective particles and anti-skid particles such that one or more first reflective particles are covered by the graphic layer while one or more second reflective particles are exposed; and
a fabric layer embedded into the polymeric substrate layer that is opposite the particle receptive layer to thereby attach the fabric layer to the polymeric substrate layer, wherein the polymeric substrate layer is positioned between the particle receptive layer and the fabric layer.

10. The ground graphic assembly of claim 9, wherein a portion of the plurality of reflective particles and anti-skid particles extend from the particle receptive layer and is positioned outside the particle receptive layer.

11. The ground graphic assembly of claim 9, wherein:
the fabric layer is positioned on an opposite side of the polymeric substrate layer as the particle receptive layer.

12. The ground graphic assembly of claim 9, wherein the polymeric substrate layer is an elastomeric material.

13. The ground graphic assembly of claim 9, wherein the anti-skid particles are irregularly shaped.

14. A method for manufacturing a floor sign, the method comprising:
providing a polymeric substrate layer;
impressing a fabric layer to a first surface of the polymeric substrate layer to thereby attach the fabric layer to the polymeric substrate layer via the polymeric substrate layer;
applying a particle receptive layer to a second surface of the polymeric substrate layer, wherein the first surface is opposite the second surface; and
at least partially embedding a plurality of surface enhancement particles into the particle receptive layer, wherein the plurality of surface enhancement particles include reflective particles.

15. The method of claim 14, further comprising:
applying an adhesive layer to the fabric layer having been attached to the polymeric substrate layer, wherein the adhesive layer is configured to adhere the floor sign to a target surface.

16. The method of claim 15, wherein applying the adhesive layer to the fabric layer further comprises:
applying the adhesive layer to the target surface; and
placing the fabric layer in contact with the adhesive layer on the target surface.

17. The method of claim 15, further comprising placing a release liner on the adhesive layer to prevent the adhesive layer from premature contact with a target surface.

18. The method of claim 14, wherein the plurality of surface enhancement particles further include anti-skid particles and/or glass beads.

19. The method of claim 14, further comprising:
curing the particle receptive layer to secure the position of the plurality of surface enhancement particles.

20. The method of claim 14, further comprising:
selectively applying a graphic layer to cover a portion of the plurality of surface enhancement particles.

* * * * *